United States Patent Office 3,493,624
Patented Feb. 3, 1970

3,493,624
METHOD FOR MAKING ALKYNYL HALIDES
Chester E. Pawloski, Bay City, and Russell L. Stewart, Midland, Mich., assignors to The Dow Chemical Company, Midland, Mich., a corporation of Delaware
No Drawing. Filed Mar. 24, 1967, Ser. No. 625,623
Int. Cl. C07c 21/22, 21/00
U.S. Cl. 260—654          6 Claims

ABSTRACT OF THE DISCLOSURE

One alkynyl halide, such as propargyl chloride, bromide or iodide, can be made from another by exchange of halogen atoms in an aqueous medium. The hydrohalide salt of an organic basic substance is used as the source of halide ion for exchange.

BACKGROUND OF THE INVENTION

It is known to produce one alkynyl halide from another by exchange of halogen atoms in a process wherein a metal halide is used in an organic solvent or in aqueous solution. Those reactions carried out in an organic solvent suffer from the disadvantages inherent in the use of organic solvents such as fire hazard, expense, toxicity and recovery steps; and the use of an organic solvent results in a homogeneous solution from which the desired products must be separated. The reaction carried out in aqueous solution suffers from the disadvantage that the unsaturated halides used, as well as the products produced, are subject to hydrolysis, leading to reduced yields if the contact time between water and the unsaturated organic halide is prolonged.

FIELD OF THE INVENTION

It is an object of the present invention to provide an improved method for the synthesis of alkynyl halides such that a nearly quantitative interchange of the two halogens involved is achieved. It is further an object of this invention to operate the method in an aqueous system with an organic base which forms a salt in an manner such that said salt-forming material is not consumed and such that the halogen exchange medium can be intermittently or continuously regenerated by distillation steps and addition of the appropriate hydrohalic acid. An additional object of this invention is to shorten the reaction time as much as possible to minimize the amount of valuable alkynyl halide lost because of hydrolysis in the aqueous medium to propargyl alcohol. These objects and others which will appear hereinafter are achieved as described below.

SUMMARY OF THE INVENTION

The invention is directed to the formation of an alkynyl halide corresponding to the formula

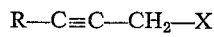

from an alkynyl halide corresponding to the formula

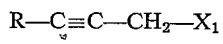

In both of the formulas above, R represents hydrogen, a lower alkyl moiety or a halomethyl moiety; X represents chlorine, bromine or iodine; and $X_1$ is chlorine, bromine or iodine and different from X. The term "lower alkyl," as employed in the present specification and claims, refers to those alkyl groups containing from 1 to 4, inclusive, carbon atoms. When the halogen of the halomethyl group in the starting material is different from X in the product alkynyl halide, the halogen of the halomethyl group in the alkynyl halide product may be the same as X or may be unchanged, depending on the extent of reaction. When the halogen of the halomethyl group in the starting material is the same as X of the product alkynyl halide, then the halogen of the halomethyl group remains unchanged.

According to the invention, an alkynyl bromide can be made from an alkynyl chloride or an alkynyl iodide, an alkynyl chloride can be made from an alkynyl bromide or an alkynyl iodide, or an alkynyl iodide can be made from an alkynyl chloride or an alkynyl bromide by warming the appropriate alkynyl halide with an aqueous solution containing the hydrohalide salt of a nitrogen-containing base, such as ammonia, a basic amine or a disubstituted basic amide, so that said hydrohalide salt contains the halide ion that is to be introduced into the alkynyl compound. The desired product can be separated from the reaction mixture by procedures such as extraction with a water-immiscible solvent, distillation directly from the reaction mixture or steam distillation from the reaction mixture.

Representative alkynyl halides which are useful in the practice of this invention and which can be either starting materials or products, depending on which is desired, are propargyl chloride, propargyl bromide, propargyl iodide, 1,4-dichloro-2-butyne, 1-bromo-4-chloro-2-butyne, 1-iodo-4-chloro-2-butyne, 1,4-dibromo-2-butyne, 1-chloro-2-butyne, 1-iodo-2-butyne, 1-bromo-2-hexyne, 1-chloro-2-heptyne, 1-bromo-4,4-dimethyl-2-pentyne and the like.

Representative amines or basic substances used to form the hydrohalide salt in this invention can be, for example, ammonia, alkyl amines, such as methylamine, dimethylamine, trimethylamine, tributylamine, 2-bromoethylamine, and N,N-dimethylcyclohexylamine; heterocyclic amines, such as quinoline, morpholine and pyridine; aryl amines, such as N,N-dimethylaniline, phenylenediamine, anisidine and aniline; alkanolamines, such as ethanolamine, diethanolamine, triethanolamine and diisopropanolamine; alkylenediamines, such as ethylenediamine and hexamethylenediamine; or a basic disubstituted amide such as dimethylformamide. Alkanolamines and simple amines such as methylamine, dimethylamine and trimethylamine are preferred because of their low cost and ready availability.

The basic substance is added to the reaction mixture in the form of its hydrochloride, hydrobromide or hydroiodide salt, whichever is needed, or the basic substance can be added in the form of the free base and converted to its hydrohalide salt in situ by the addition of an appropriate amount of the desired hydrohalic acid, either as a gas or as an aqueous solution. It is also possible to obtain the hydrobromide salt in solution by treating an aqueous solution of the hydrochloride salt of the basic substance with a slight molar excess of either gaseous or aqueous hydrogen bromide. After introduction of the hydrogen bromide, substantially all of the chloride ion in the form of hydrogen chloride is removed by distillation nearly to dryness. Since the hydrogen chloride present forms a lower boiling mixture with water than does hydrogen bromide, the distillation residue is composed mainly of the hydrobromide salt of the basic substance employed. The distillation residue can then be diluted with water to a suitable volume and used in the conversion of an alkynyl chloride to an alkynyl bromide. This latter procedure has the advantage that, in some instances, the basic substances contemplated by this invention are available with fewer impurities as the hydrochloride salts than as the free bases. In such cases it is preferred to start with the hydrochloride salts since impurities in the basic substance employed lead to lower conversions to the product desired. The process described for converting the basic substance from its hydrochloride salt to its hydrobromide salt is also useful for regenerating hydrobromide salt solutions from the hydrochloride salt solutions obtained from the production of an alkynyl bromide, as will be pointed out in more detail hereinbelow. A similar process for producing hydroiodide salt solutions from hydrochloride or hydrobromide salt solutions can be carried out by adding an aqueous solution of hydrogen iodide to a hydrochloride or hydrobromide salt solution and distilling off the lower boiling aqueous solution of hydrogen chloride or hydrogen bromide.

The basic substance described above is employed in a molar ratio to the alkynyl halide starting material of from about one to one to about twenty to one, respectively. If the basic hydrohalide salt is used in an amount less than equimolar with respect to the alkynyl halide, halogen exchange is incomplete, leading to low conversion to the desired product. The preferred range, which gives high conversions, is about ten moles of the hydrohalide salt to one mole of the alkynyl halide. No material is lost or wasted by using greater than equimolar amounts of the hydrohalide salt in the case where an alkynyl bromide or alkynyl iodide is being produced since the halogen exchange medium can be regenerated by addition of hydrogen bromide or hydrogen iodide in a molar amount slightly in excess of the molar amount of alkynyl halide produced, followed by distillation to remove the hydrogen halide generated in the alkynyl halide exchange reaction.

The process of the invention can be run at atmospheric pressure or at superatmospheric pressure. If run at superatmospheric pressure, the pressure is conveniently generated by heating the reactants in a closed system. It is advantageous and preferred to execute the process at superatmospheric pressure as the desired reaction temperature can be achieved more quickly, thus minimizing the length of time the hydrolyzable alkynyl halides must be in contact with an aqueous system.

The process of the invention is carried out at temperatures of from about 25° C. to about 120° C. At temperature substantially below 25° C. the rate of halogen exchange is too low to be practical. The preferred temperature range is from about 70° C. to about 85° C. At temperatures above 80° C. to 85° C., some haloallenes are formed in addition to the desired alkynyl halide, particularly in the case of the alkynyl iodides, complicating the purification of the desired alkynyl halide and lowering the yield of the desired product.

The time required for carrying out the process can vary from a few minutes to 8 hours or more. The time required varies with the other conditions chosen such as pressure and temperature. When the reaction is run batchwise at atmospheric pressure, reaction times of 4 to 8 hours are required as the reaction temperature is not reached during the initial stages of the reacton. When the reaction is run in a closed system at superatmospheric pressure, the reaction time can be much shorter. Periods as short as ten minutes or as long as six hours can be used successfuly, and a convenient and thus preferred range is from about 10 minutes to about 80 minutes. When a closed system is used, the desired reaction temperature can be achieved very rapidly and a reaction period of about ten minutes to about eighty minutes is sufficient to give high conversions to the alkynyl halide desired. Such a short reaction time is advantageous in that the contact time between the hydrolyzable alkynyl halides and the reaction medium is minimized, leading to higher conversions than when longer times are employed. By use of a continuous-flow reactor, even shorter times can be used.

It is desirable to use relatively concentrated aqueous solutions of the hydrohalide salt of the particular basic substance employed. Solutions containing from about 50 to about 85 percent of the hydrohalide salt can be used, and it is preferred to use a solution consisting of from about 75 to about 85 percent of the hydrohalide salt. After the organic materials have been separated from the reaction mixture in the case when an alkynyl chloride is converted to an alkynyl bromide, a molar amount of aqueous hydrobromic acid slightly in excess of the molar amount of alkynyl chloride consumed may be added to the aqueous reaction residue to regenerate the hydrobromide salt. Distillation of this mixture nearly to dryness removes the chloride present in the form of the hydrogen chloride—water solution which has a boiling point lower than the hydrogen bromide—water solution. The residue from this distillation is composed of the hydrobromide salt of the particular basic substance employed and is used for further conversion of an alkynyl chloride to an alkynyl bromide after adjusting the concentration to that desired by addition of water. By operating the process in this manner it is possible to convert essentially all of the bromide ion used into the organic bromide desired. In a similar manner, when an alkynyl chloride is converted to an alkynyl iodide, a molar amount of aqueous hydroiodic acid slightly in excess of the alkynyl chloride consumed may be added to the aqueous reaction residue to regenerate the hydrogen iodide salt, followed by distillation to remove the lower boiling hydrogen chloride—water solution. The residue from this distillation is composed of the hydrogen iodide salt of the particular basic substance employed and may be used for further conversion of an alkynyl chloride to an alkynyl iodide after adjusting the concentration to that desired by addition of water.

When operating the process under the preferred conditions, conversions of the alkynyl halide employed are from about 50 to about 90 percent to the desired alkynyl halide. For example, conversion of propargyl chloride to propargyl bromide is in the range of 60 to 80 percent.

The organic material can be separated from the reaction mixture by extraction with a water-immiscible solvent, by direct distillation from the reaction mixture, or by steam distillation of the reaction mixture. Steam distillation of the organic material from the reaction mixture is preferred.

The following examples merely illustrate the present invention and are not to be construed as limiting.

EXAMPLE 1

A 67 percent solution of 201 grams (1.6 moles) of dimethylamine hydrobromide in water, regenerated from a dimethylamine hydrochloride solution by addition of a slight excess of 48 percent aqueous hydrogen bromide followed by distillation to remove hydrogen chloride and water, was mixed with 41 grams (0.55 mole) of propargyl chloride in a vessel suitable for operation at superatmospheric pressure. The vessel was sealed and heated at 80° C. for 75 minutes. After being cooled, the organic material was separated from the reaction mixture by steam distillation. Fractional distillation showed that 64 percent of the propargyl chloride reacted, and the yield of propargyl bromide based on the amount of propargyl chloride consumed was 90 percent.

EXAMPLE 2

An 80 percent solution of 5 molar parts of trimethylamine hydrobromide, prepared by addition of an equimolar amount of 48 percent aqueous hydrogen bromide to the free amine, followed by evaporation of the appropriate amount of water, was reacted with 1 molar part of propargyl chloride in substantially the manner of Example 1. In this case 77 percent of the propargyl chloride reacted, leading to an 87 percent yield of propargyl bromide based on the propargyl chloride consumed.

EXAMPLE 3

18 grams of dimethylformamide (0.246 mole) was treated with 34 grams (0.202 mole) of 48 percent aqueous hydrogen bromide. Reaction of this mixture at 70° C. in a closed system with 10 grams (0.134 mole) of propargyl chloride for 6.5 hours gave a 55 percent conversion to propargyl bromide after a work-up substantially as in Example 1.

EXAMPLE 4

6 grams (0.049 mole) of 1,4-dichloro-2-butyne, 15 grams (0.205 mole) of dimethylformamide and 30 grams of 48 percent hydrobromic acid (0.178 mole of hydrogen bromide) were mixed in a vessel suitable for operation at superatmospheric pressure. This mixture was heated in the closed container for 6.5 hours at 80° C. to give an 80 percent conversion of the starting material to a mixture of 1-bromo-4-chloro-2-butyne and 1,4-dibromo-2-butyne after a work-up substantially as in Example 1. Longer reaction times and/or higher reaction temperatures result in the production of the dibromobutyne to the substantial exclusion of the bromochlorobutyne.

What is claimed is:

1. In a process for making an alkynyl halide of the formula $$R-C\equiv C-CH_2X$$

wherein R is hydrogen, lower alkyl or halomethyl, and X is a halogen of atomic number 17 to 53, by reacting in the liquid phase an alkynyl halide of the formula $$R-C\equiv C-CH_2X_1$$

in which $X_1$ is a halogen of atomic number 17 to 53 and different from X, with a source of halide ion corresponding to halide X, the improvement wherein the source of the halide ion is an aqueous solution of the hydrohalide salt of a nitrogenous basic substance in which the halide ion corresponds to X.

2. The process of claim 1 wherein R is hydrogen, X is bromine and $X_1$ is chlorine.

3. The process of claim 2 wherein the aqueous hydrobromide salt solution of an organic basic substance is obtained from an aqueous hydrochloride salt solution of a nitrogenous basic substance by addition of hydrogen bromide followed by distillation to remove hydrogen chloride.

4. The process of claim 2 wherein about 1 to about 20 moles of the hydrobromide salt of an organic basic substance are used per mole of propargyl chloride starting material.

5. The process of claim 1 wherein R is hydrogen, X is chlorine and $X_1$ is bromine.

6. The process of claim 1 wherein the nitrogenous basic substance is ammonia, a lower alkylamine, a di(loweralkyl)amine, a tri(loweralkyl)amine, a lower alkanolamine, a di(loweralkanol)amine, a tri(loweralkanol)amine, an alkylenediamine containing up to six carbon atoms, an arylamine containing six to eight carbon atoms, a heterocyclic amine containing four to nine carbon atoms or dimethylformamide.

References Cited

UNITED STATES PATENTS

| | | | |
|---|---|---|---|
| 2,769,815 | 11/1956 | Hardy et al. | 260—649 X |
| 3,130,222 | 4/1964 | Asadorian et al. | 260—658 X |

FOREIGN PATENTS

| | | |
|---|---|---|
| 672,757 | 5/1952 | Great Britain. |
| 925,147 | 5/1963 | Great Britain. |

LEON ZITVER, Primary Examiner

J. BOSKA, Assistant Examiner